US009308584B2

(12) United States Patent
Burgess et al.

(10) Patent No.: US 9,308,584 B2
(45) Date of Patent: Apr. 12, 2016

(54) SINTERED FIBER FILTER

(71) Applicant: Mott Corporation, Farmington, CT (US)

(72) Inventors: Derek Burgess, Plainville, CT (US); Wayne F. White, Granby, CT (US); Alfred M. Romano, West Hartland, CT (US); Todd W. Pflugbeil, Bristol, CT (US); Richard D. Balazy, Terryville, CT (US); Kenneth L. Rubow, Avon, CT (US); John E. Rosenberger, Plantsville, CT (US)

(73) Assignee: MOTT CORPORATION, Farmington, CT (US)

( * ) Notice: Subject to any disclaimer, the term of this patent is extended or adjusted under 35 U.S.C. 154(b) by 0 days.

(21) Appl. No.: 14/161,001

(22) Filed: Jan. 22, 2014

(65) Prior Publication Data

US 2014/0134036 A1    May 15, 2014

Related U.S. Application Data

(60) Division of application No. 13/349,401, filed on Jan. 12, 2012, now Pat. No. 8,673,065, which is a continuation of application No. 12/256,134, filed on Oct. 22, 2008, now Pat. No. 8,097,071.

(60) Provisional application No. 60/982,328, filed on Oct. 24, 2007.

(51) Int. Cl.
*B01D 46/00* (2006.01)
*B22F 7/00* (2006.01)
*B01D 39/20* (2006.01)

(52) U.S. Cl.
CPC ............ *B22F 7/002* (2013.01); *B01D 39/2044* (2013.01)

(58) Field of Classification Search
CPC ............ B01D 39/2044; B01D 29/111; B01D 67/0046; B01D 46/10; B01D 46/521; B01D 46/2411
See application file for complete search history.

(56) References Cited

U.S. PATENT DOCUMENTS 3,252,270 A    5/1966    Pall et al.
3,313,621 A *  4/1967    Mott .............................. 419/36
(Continued)

FOREIGN PATENT DOCUMENTS

DE    19924675 A1    11/2000
EP    0248132 A1    12/1987
(Continued)

OTHER PUBLICATIONS

Author Unknown, "Test Method for Efficiency Qualification of Point-Of-Use Gas Filters," Semiconductor Equipment and Materials International (SEMI) F38-0699, 1999, 5 pages.
(Continued)

*Primary Examiner* — Amber R Orlando
(74) *Attorney, Agent, or Firm* — Wilmer Cutler Pickering Hale and Dorr LLP

(57) ABSTRACT

Sintered fiber filters are provided that can afford high particle capture efficiency and/or low pressure drop during operation, and are useful in applications such as semiconductor processing. The shape of at least a portion of the individual fibers (e.g., metal fibers) used to make the filter have a three-dimensional aspect, which allows for a low packing density and high porosity filtration media. Certain filters have a cylindrical or tube-like shape with tapered ends of higher density. Methods of making such filters, for example, using axial pressing, are also described.

15 Claims, 11 Drawing Sheets

(56) References Cited

U.S. PATENT DOCUMENTS

| | | | |
|---|---|---|---|
| 3,567,437 A * | 3/1971 | Mott | 419/42 |
| 3,573,158 A | 3/1971 | Pall et al. | |
| 3,632,243 A | 1/1972 | Mott | |
| 4,078,965 A * | 3/1978 | Berger et al. | 162/156 |
| 4,126,560 A | 11/1978 | Marcus et al. | |
| 4,196,027 A * | 4/1980 | Walker et al. | 156/62.2 |
| 4,249,918 A | 2/1981 | Argo et al. | |
| 4,303,472 A * | 12/1981 | Walker et al. | 162/221 |
| 4,470,953 A * | 9/1984 | Bruce | 419/6 |
| 4,687,579 A * | 8/1987 | Bergman | 210/347 |
| 5,088,554 A * | 2/1992 | Arterbury et al. | 166/228 |
| 5,114,447 A | 5/1992 | Davis | |
| 5,152,890 A * | 10/1992 | Linnersten | 210/315 |
| 5,171,341 A | 12/1992 | Merry | |
| 5,204,067 A | 4/1993 | Haerle | |
| 5,283,106 A | 2/1994 | Seiler et al. | |
| 5,380,580 A | 1/1995 | Rogers et al. | |
| 5,458,664 A | 10/1995 | Ishii et al. | |
| 5,486,220 A | 1/1996 | Honda et al. | |
| 5,487,694 A * | 1/1996 | Deming | 451/49 |
| 5,487,771 A * | 1/1996 | Zeller | 55/523 |
| 5,497,620 A * | 3/1996 | Stobbe | 60/303 |
| 5,545,242 A | 8/1996 | Whitlock et al. | |
| 5,605,553 A * | 2/1997 | Connolly et al. | 55/487 |
| 5,626,651 A | 5/1997 | Dullien | |
| 5,674,802 A * | 10/1997 | Sheppard | 502/439 |
| 5,803,991 A | 9/1998 | Tsubouchi et al. | |
| 5,908,587 A * | 6/1999 | Gross et al. | 264/28 |
| 5,917,066 A | 6/1999 | Eisenmann et al. | |
| RE36,249 E | 7/1999 | Zeller | |
| 5,937,263 A | 8/1999 | Eisenmann et al. | |
| 6,080,219 A | 6/2000 | Jha et al. | |
| 6,375,014 B1 | 4/2002 | Garcera et al. | |
| 6,375,705 B1 * | 4/2002 | Judkins | 75/235 |
| 6,632,356 B2 | 10/2003 | Hallan et al. | |
| 6,674,042 B1 * | 1/2004 | Walder et al. | 219/78.01 |
| 6,776,689 B2 * | 8/2004 | Eichelberger | 451/8 |
| 6,776,820 B2 | 8/2004 | Bikson et al. | |
| 7,045,219 B2 | 5/2006 | Losfeld et al. | |
| 7,112,237 B2 | 9/2006 | Zeller et al. | |
| 7,585,347 B2 * | 9/2009 | Isomura et al. | 55/523 |
| 7,722,827 B2 | 5/2010 | Fischer et al. | |
| 8,097,071 B2 | 1/2012 | Burgess et al. | |
| 8,147,736 B2 * | 4/2012 | Hayden et al. | 264/71 |
| 8,257,625 B2 * | 9/2012 | Waltl et al. | 264/86 |
| 2005/0163689 A1 * | 7/2005 | Akerman et al. | 423/177 |
| 2007/0202001 A1 | 8/2007 | Stournaras et al. | |
| 2008/0034967 A1 | 2/2008 | Ping | |
| 2011/0139797 A1 * | 6/2011 | Reeves et al. | 220/668 |

FOREIGN PATENT DOCUMENTS

| | | |
|---|---|---|
| EP | 0561001 A1 | 9/1993 |
| GB | 944319 A | 12/1963 |
| JP | S63-63645 B2 | 12/1988 |
| JP | H04-317710 A | 11/1992 |
| JP | 5154322 A | 6/1993 |
| JP | 5261223 A | 10/1993 |
| JP | 6279809 A | 10/1994 |
| JP | H08-229330 A | 9/1996 |
| JP | H09-57030 A | 3/1997 |
| JP | H10-263336 A | 10/1998 |
| JP | 11169632 A | 6/1999 |
| JP | 2000063967 A | 2/2000 |
| JP | 2004089986 A | 3/2004 |
| JP | 2005144380 A | 6/2005 |
| JP | 2007131957 A | 5/2007 |
| WO | WO-96/08302 A2 | 3/1996 |
| WO | WO-02057035 | 7/2002 |
| WO | WO-2006/107721 | 10/2006 |

OTHER PUBLICATIONS

Japanese Office Action issued by the Japanese Patent Office for Application No. 2010-531202 mailed on Sep. 10, 2014 (6 pages includes translation).

Japanese Office Action issued by the Japanese Patent Office for Appiication No. 2012-279486 mailed on May 23, 2014 (3 pages) (Translation only).

International Search Report and Written Opinion, International Application No. PCT/US2008/080762, Apr. 24, 2009, 12 pages.

Rubow, et al., "A Low Pressure Drop Sintered Metal Filter for Ultra-High Purity Gas Systems," Proceedings of the 43rd Annual Technical Meeting of the Institute of Environmental Sciences, Los Angeles, CA, May 1997, 8 pages.

Rubow, et al., "Particle Penetration Characteristics of Porous Metal Filter Media for High Purity Gas Filtration," Proceedings of the 37th Annual Technical Meeting of the Institute of Environmental Sciences, Feb. 1991, pp. 834-840, 8 pages.

Rubow, K. "Submicron Aerosol Filtration Characteristics of Membrane Filters," Ph.D. Thesis, University of Minnesota, Mechanical Engineering Department, Minneapolis, MN, Dec. 1981, pp. 59-97, 49 pages.

Supplementary European Search issued by the European Patent Office for European Patent Application No. EP08842457, dated Feb. 27, 2012 (1 page).

* cited by examiner

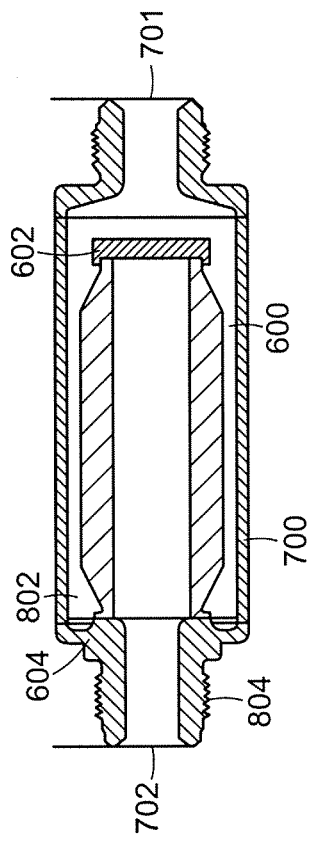
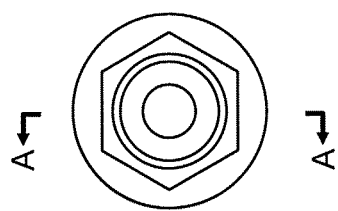
FIG. 8B
FIG. 8A

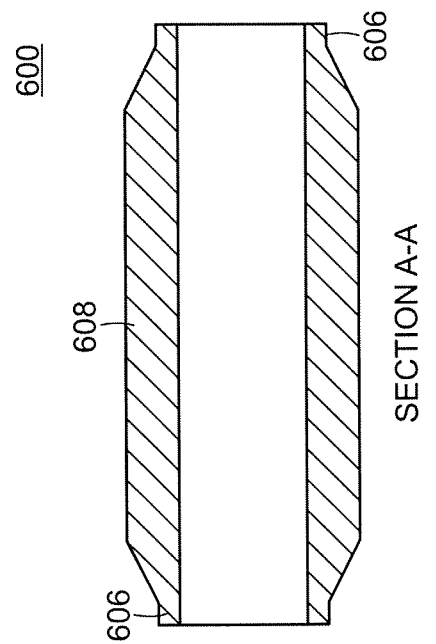
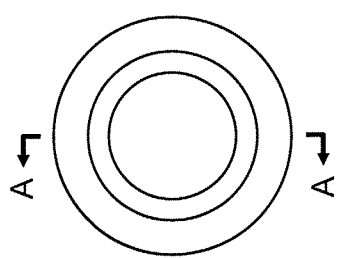
FIG. 9B
FIG. 9A

SINTERED FIBER FILTER

CROSS-REFERENCE TO RELATED APPLICATIONS

This application is a divisional of U.S. patent application Ser. No. 13/349,401, filed Jan. 12, 2012, which is a continuation of U.S. patent application Ser. No. 12/256,134, entitled "Sintered Fiber Filter," filed Oct. 22, 2008, now U.S. Pat. No. 8,097,071, which claims the benefit under 35 U.S.C. §119(e) of U.S. Provisional Patent Application Ser. No. 60/982,328, filed Oct. 24, 2007, and entitled "Sintered Fiber Filter," all of which are incorporated by reference herein in their entirety.

BACKGROUND

1. Technical Field

The field relates to sintered metal filters and methods of making and using the same to filter fluids, including in applications requiring high efficiency filtration and/or a low pressure drop across the filter.

2. Description of Related Art

Porous metal filters, for example, made from metal powder or metal fiber, are widely used in a variety of applications. For instance, in semiconductor manufacturing and other industrial processes, a very clean environment often is required to produce sensitive products. For example, in the electronics industry, inline filters are often used to filter particulate matter from fluids in order to reduce the introduction of such particulate matter into the manufacturing process for semiconductors, thereby reducing the contamination of electronic products. Fluids can comprise gases and/or liquids.

Some applications in the electronics industry use inline filters that can achieve a high efficiency rate of removal of 99.9999999%, determined at a most penetrating particle size, i.e., 9 log reduction value (9LRV), at a rated flow. The test methodology for evaluating 9LRV rating is described in Rubow, K. L., and Davis, C. B., "*Particle Penetration Characteristics of Porous Metal Filter Media For High Purity Gas Filtration*," Proceedings of the 37rd Annual Technical Meeting of the Institute of Environmental Sciences, pp. 834-840 (1991); Rubow, K. L., D. S. Prause and M. R. Eisenmann, "A Low Pressure Drop Sintered Metal Filter for Ultra-High Purity Gas Systems", *Proc. of the 43$^{rd}$ Annual Technical Meeting of the Institute of Environmental Sciences*, (1997); and Semiconductor Equipment and Materials International (SEMI) test method SEMI F38-0699 "Test Method for Efficiency Qualification of Point-of-Use Gas Filters," all of which are incorporated herein by reference.

Another characteristic that can be important to the electronics industry is the pressure drop across inline filters. While pressure drop can vary with the flow rate of fluid through the filter and the pressure levels of the fluid, lower pressure drops are generally preferred in the industry. This is because some process fluids, such as gases produced from vaporization of liquid sources, have limited abilities to pressurize the gas system; thus, filters with higher pressure drops could adversely reduce (restrict) the flow of process fluids. Furthermore, in a typical high purity fluid supply system each component contributes to the overall pressure drop across the system. The fluid filter is typically the most significant contributor to the total system pressure drop. Reducing pressure drop across each, or any, component reduces the overall pressure drop across the system. This is desirable to the system operator, as it allows for beneficial operation economics by reducing the system pressure supply requirements. For example, in a system that has fluid supplied by a compressed gas cylinder, more of the volume of the gas can be accessed for wafer processing by reducing pressure drop across the system.

SUMMARY

Described herein are sintered fiber filters. In certain embodiments, the filters provide high efficiency removal of particulates and/or low pressure drop during operation, and are useful in applications such as semiconductor processing. The shape of at least a portion of the individual fibers (e.g., metal fibers) that make up the filter have a three-dimensional aspect, which allows for a low packing density and high porosity filtration media. Such low density/high porosity promotes a low pressure drop across the resultant filter formed from the media. Varying the degree of compression and/or varying the quantity of fibers during molding of the filter allows for control of the filtration rating, or particle capture efficiency and differential pressure of the resultant filter. In certain embodiments, the filter has a cylindrical or tube-like shape, in some instances having tapered ends of higher density that allow for welding, e.g., to a metal end cap and/or filter assembly. Methods of making such filters, for example, using axial pressing, are also disclosed.

One aspect provides a filter element including a sintered fiber metal media. The filter element has a cylindrical body. In some instances, the cylindrical body has an outer diameter that decreases from a center portion of the element toward an end portion of the element, and the fiber media has a density that increases from a center portion of the element toward an end portion of the element. In at least some embodiments, the density of the media at a center portion of the element is about 15% or less. In certain embodiments, the element provides a filtration efficiency of at least 5 log reduction value (LRV) at a flux of 33 SLM/in$^2$, in some instances at a flux of 37 SLM/in$^2$, and in some instances at a flux of 37.9 SLM/in$^2$, measured at a most penetrating particle size, with nitrogen flow and atmospheric conditions at the exit of the filter. In some embodiments, the filter element has a filtration efficiency of at least 9 LRV at a flux of 6 SLM/in$^2$, or at a flux of 7 SLM/in$^2$, or at a flux of 7.6 SLM/in$^2$, or at a flux of 106 SLM/in$^2$. In some embodiments, the filter element is contained in a metal housing. In other embodiments, the filter element is not contained in a metal housing, but is affixed to hardware at each end. Nonlimiting examples of such hardware include flanges, tubes, and mounts. In certain embodiments, the density of the media at a center portion of the element is about 12% or less, for example, about 6% or less. The disclosed element generally referred to herein as a "filter element" can also be used in other applications besides filtration. For example, such an element may be used as a flow diffuser, a sparger, a dampener, a wick, a demister, a silencer, a straightener, or another related element.

In some embodiments, the cylindrical body has an inner diameter at the center of the filter element between about 0.1 inches and about 2.0 inches, for example, between about 0.4 inches and about 0.8 inches. In some embodiments, the cylindrical body has a wall thickness at the center of the filter element between about 0.1 inches and about 1.5 inches. In certain embodiments, the filer element has a thickness of about 0.2 inches to about 0.3 inches at the center of the element, and a thickness of about 0.1 inch at the ends of the element. In some embodiments, the length of the filter element is about 0.5 inches to about 15 inches, for example, about 1 inch to about 5 inches, or about 2 inches to about 3 inches.

In some embodiments, the filter element is used to filter a fluid. A fluid to be filtered is contacted with the filter element. In certain embodiments, the fluid is a gas. In certain embodiments, the filter provides a pressure drop between about 2 psi and about 10 psi at a flux of 6.8 to 42 SLM/in², with nitrogen flow and atmospheric exit conditions. In some embodiments, the filter element provides a pressure drop between about 0.1 psi and about 5 psi at a flux of 0.8 to 42 SLM/in². In other embodiments, the filter element provides a pressure drop between about 5 psi and about 25 psi at a flux of 15 to 106 SLM/in². In yet other embodiments, the filter element provides a pressure drop between about 0.1 psi and about 0.5 psi at a flux of 1.6 to 8 SLM/in². In certain embodiments, the filter element provides an efficiency (LRV) per unit pressure drop between about 1 and about 11 $psid^{-1}$, at a flux of 7 to 37 SLM/in², or in another embodiment LRV per unit pressure drop could be as low as 0.4 $psid^{-1}$ at a flux of up to 106 SLM/in².

Another aspect provides a method of making a sintered metal fiber filter element. The method includes providing a mold having a cylindrical cavity with an end closure at one end of the cylindrical cavity, and a fill cap at another end of the cylindrical cavity. The fill cap is removable to provide an open end, and a core rod is movably sealed in the end closure and extends coaxially within the cavity. The mold is oriented vertically with the open end disposed upwardly, and metal fiber and liquid is introduced into the cavity through the open end substantially radially evenly about the core rod. A pressure differential is created in the mold to expel liquid from the mold. Pressure is applied to the mold and thereby to the metal fiber in the cavity, so that the metal fiber coheres to form a substantially tube-shaped structure. The substantially tube-shaped structure is removed from the mold and sintered to obtain a porous tube-shaped sintered metal filter element. In some embodiments, the mold is vibrated. In some embodiments, the pressure differential is created with a vacuum. In other embodiments, the pressure differential is created by applying pressure to the fill cap. In some embodiments, the ends of the porous tube-shaped sintered metal filter element are densified, for example, by rotating the filter element while applying a roller burnisher tool to the ends of the filter element. In another aspect, a method of filtering a fluid is provided, where the fluid is filtered with a filter element comprised of a sintered fiber media, where the filter element has a cylindrical body with an outer diameter that decreases from a center portion toward an end portion, where the density of the fiber media increases from a center portion to and end portion, where the density of the media at a center portion is about 15% or less, and where the filter element provides a filtration efficiency of at least 5 LRV at a flux of 37.9 SLM/in² at a most penetrating particle size under nitrogen flow and atmospheric conditions at filter exit.

In some embodiments, the end closure of the mold is removable. In certain embodiments, a vacuum line is attached to the mold, and opened while introducing metal fiber and liquid to the cavity. In some embodiments, the tube-shaped structure is dried before sintering. In certain embodiments, an end of the porous tube-shaped sintered metal filter element is welded to an end cap and/or a filter housing.

BRIEF DESCRIPTION OF THE DRAWINGS

The following figures are presented for the purpose of illustration only, and are not intended to be limiting.

FIG. 8A is a top plan view of a filter according to certain embodiments. FIG. 8B is a longitudinal cross-sectional view of a filter showing the filter element inside according to certain embodiments.

FIG. 9A is a top plan view of a filter element according to certain embodiments. FIG. 9B is a longitudinal cross-sectional view of a filter element according to certain embodiments.

DETAILED DESCRIPTION

Figure 1:
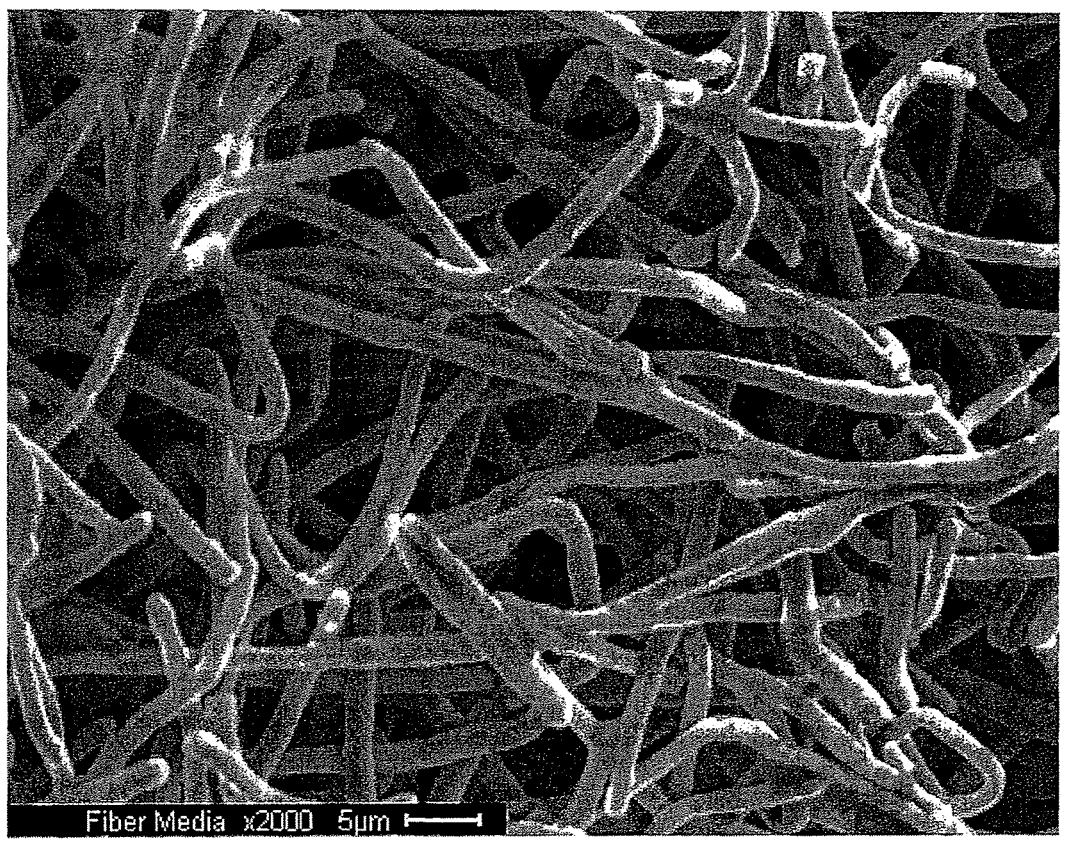
FIG. 1 is a photomicrograph of metal fiber media, after sintering, used in certain embodiments, at a magnification of 2000 times.

Sintered fiber filters are provided that, in at least some embodiments, provide high efficiency and/or low pressure drop during operation, e.g., for fluid filtration in semiconductor processing. In certain embodiments, the filter has a cylindrical or tube-like shape.

Filter elements as described herein are made from metal, metal oxide, or ceramic material. In at least some embodiments, the filter element is made from a metal fiber media wherein at least a portion of the individual metal fibers that make up the media have a shape with some three-dimensionality, which allows for a low packing density and high porosity filtration media. For example, when poured, the fibers can have a packing density as low as about 2-3%. The term "three-dimensional aspect" or "three-dimensionality" as used herein with respect to the shape of a metal fiber refers to random directional changes in the major axis of the fiber compared to a theoretical straight fiber, e.g., leading to a curved, kinked, entangled, cork screw, lazy curve, z-shape, 90 degree bend, or pigtail shape. When the fibers having a shape with some three-dimensionality are laid down or poured, they tend to interlock, resulting in a media having a fluffy texture, with a substantial amount of open space between the individual fibers. In certain embodiments, at least about 5%, at least about 10%, at least about 20%, at least about 30%, at least about 40%, at least about 50%, at least about 60%, at least about 75%, or at least about 90% of the individual metal fibers have a shape with a three-dimensional aspect. The percentage of fibers in the media having a shape with some three-dimensionality is determined, for example, by examining a representative number of fibers under a microscope.

In some embodiments, the fibers are short metal fibers including curved and entangled fibers. Such fibers are commercially available (e.g., from N.V. Bekaert S.A., Belgium). An example of such fibers, and methods for their preparation are described in U.S. Pat. No. 7,045,219 (Losfeld et al.), which is incorporated herein by reference. As a brief summary, U.S. Pat. No. 7,045,219 discloses a set of short metal fibers including "entangled" fibers and "curved" fibers, e.g., having an equivalent diameter between 1 and 150 microns. The entangled fibers may represent 5 to 35% of the fibers, and have an average length at least 5 times the average length of the curved fibers. The curved fibers may have an average length between 10 and 2000 microns, and a portion of the curved fibers may have a major axis that changes over an angle of at least 90 degrees. The length/diameter ratio of the entire set of fibers may be more than 5. The entangled fibers are entangled within themselves or with each other, and the major axis of each entangled fiber changes often and unpredictably. Some of the fibers have a chaotic shape, look like a pigtail, or are present in a shape that resembles a clew. When poured, the fibers may have an apparent density in the range of 10 to 40%. The short metal fibers can be obtained by individualizing metal fibers in a carding operation, cutting or entangling and sieving the fibers, using a comminuting machine.

Figure 2:
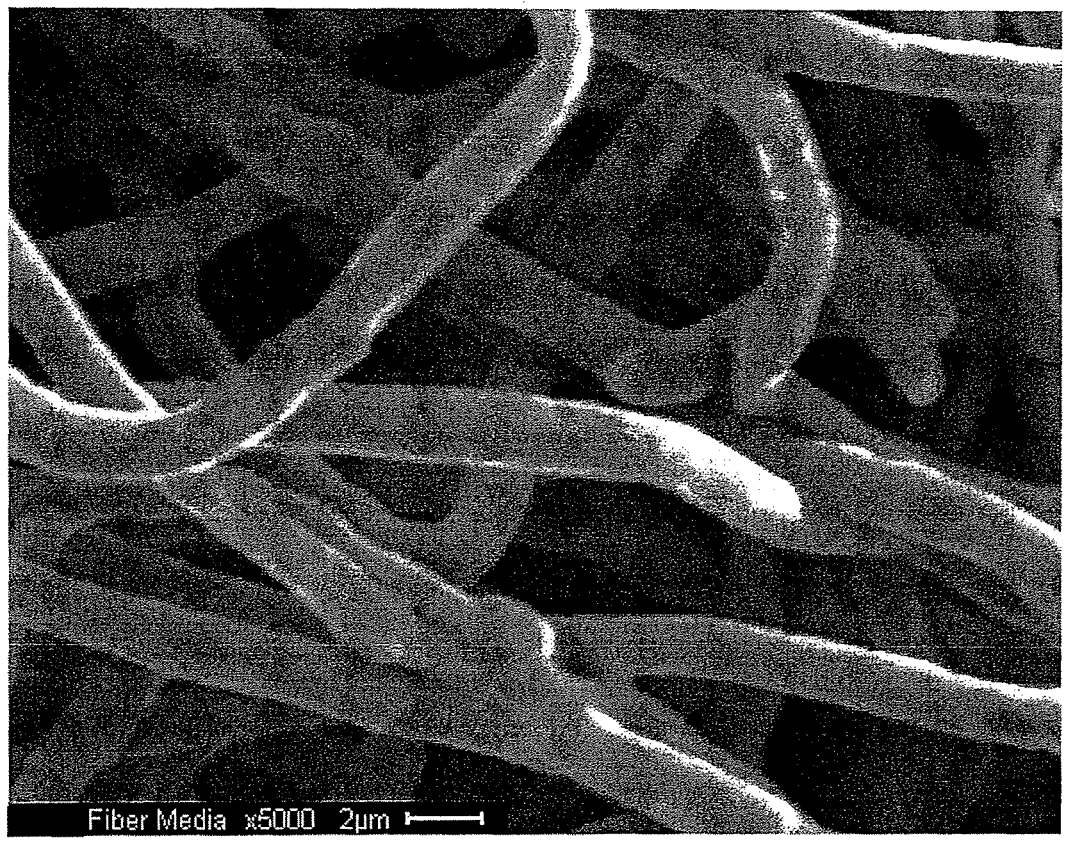
FIG. 2 is a photomicrograph of metal fiber media, after sintering, used in certain embodiments, at a magnification of 5000 times.
Figure 3:
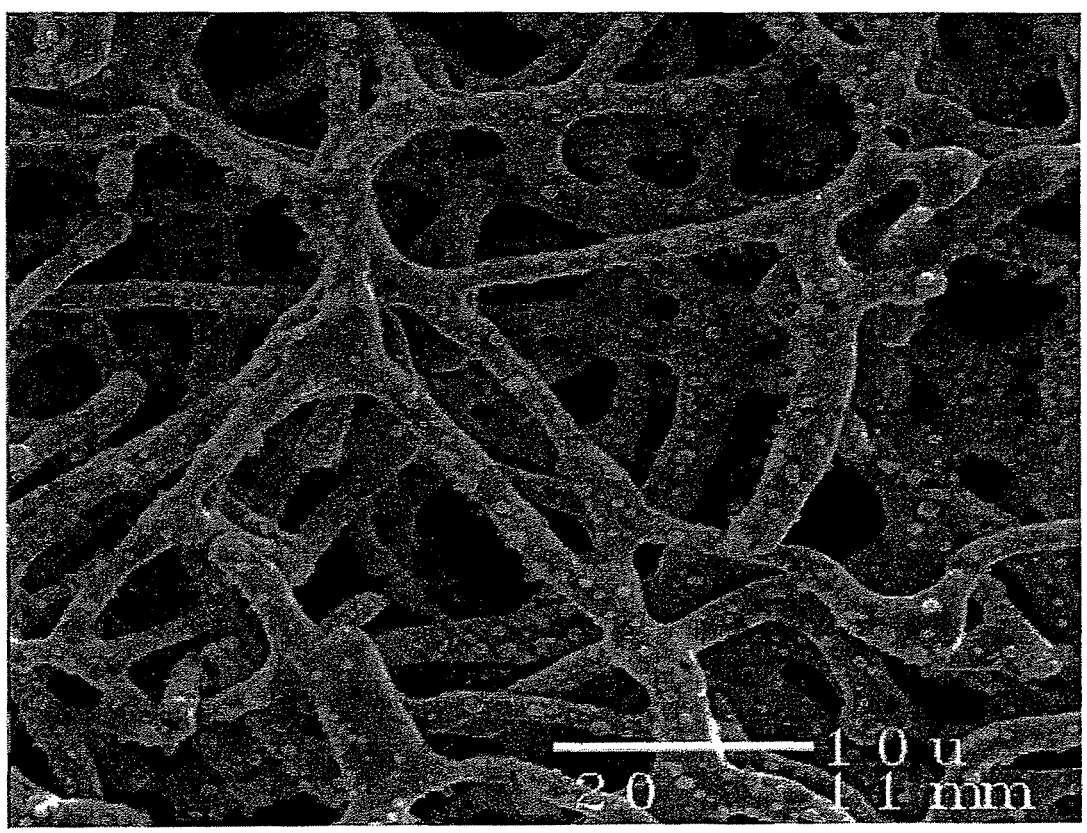
FIG. 3 is a photomicrograph of metal fiber media according to certain embodiments, after it has been sintered and used for filtration, at a magnification of 3500 times, laden with particulate matter that was filtered.
Figure 4:
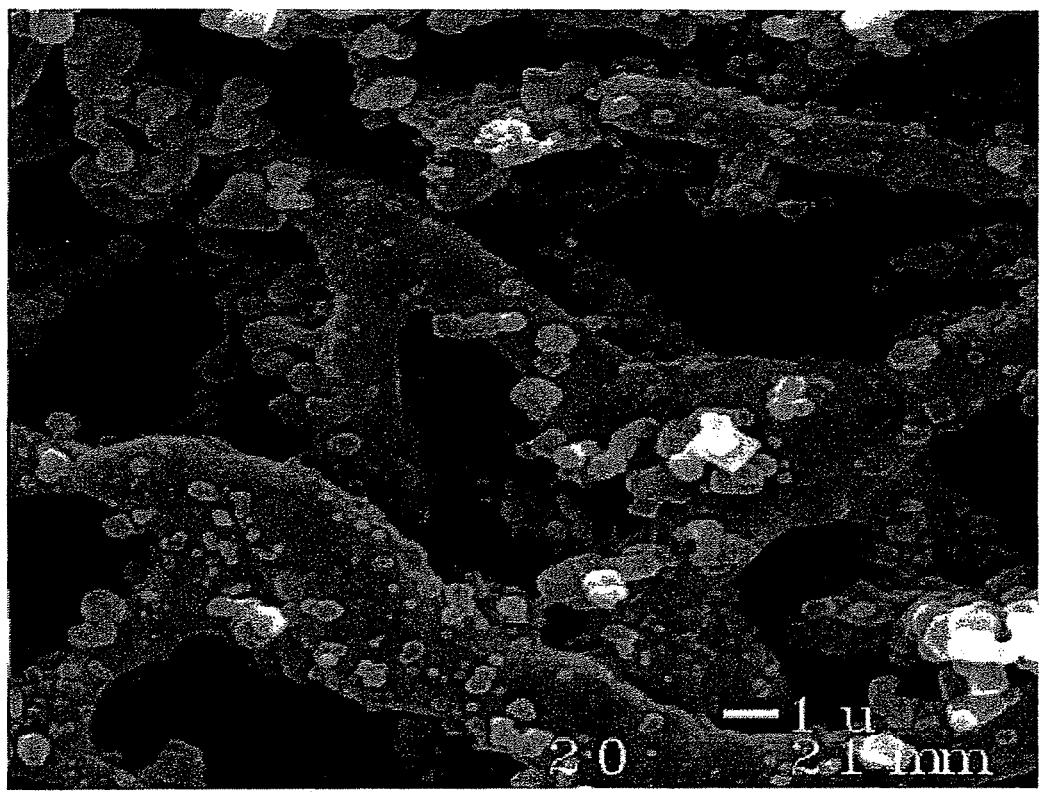
FIG. 4 is a photomicrograph of metal fiber media according to certain embodiments, after it has been sintered and used for filtration, at a magnification of 7500 times, laden with particulate matter that was filtered.

As a result of their shapes, the fibers employed according to various embodiments herein tend to have a low packing density. Thus, for a given volume of fibers, a significant portion of the volume is empty or ambient space, i.e., the porosity tends to be high. This low packing density/high porosity allows the filters made from such fibers to exhibit a low pressure drop as fluid flows through the filter. The low packing density of the fibers can be seen in FIGS. 1 and 2, which illustrate fibers used in certain embodiments, after they have been sintered, under high magnification. FIG. 1 shows the fibers at 2000 times magnification and FIG. 2 shows the fibers at 5000 times magnification. FIGS. 3 and 4 show the metal fiber media according to certain embodiments, after it has been sintered and used for filtration, laden with particulate matter that was filtered. FIG. 3 shows a magnification of 3500 times, and FIG. 4 shows a magnification of 7500 times.

Useful materials for making the fibers of some embodiments include, but are not limited to, one or more of stainless steel, including 316L stainless steel, nickel, thallium, titanium, aluminum, tungsten, copper, metal oxides, ceramic materials, and alloys, such as Hastelloys, bronze, Cu-alloys, and Fe—Cr—Al alloys.

Exemplary dimensions for the fibers used according to various embodiments include fiber equivalent diameters of about 1 micron to about 150 microns, for example, about 1 micron to about 75 microns, about 1 micron to about 50 microns, about 1 micron to about 35 microns, or about 1 micron to about 10 microns; and fiber lengths of about 10 microns to about 2000 microns, for example, about 10 microns to about 1000 microns, about 10 microns to about 200 microns, or about 10 microns to about 100 microns. The "equivalent diameter" of a fiber refers to the diameter of a circle having the same cross-sectional area as the fiber cut perpendicular to its major axis. The length of a fiber refers to the distance along its major axis if the fiber were straightened out such that there is no change in the major axis of the fiber.

In certain embodiments, a method of making a filter or filter media from such fibers is disclosed. A non-limiting example of such a method includes molding the fiber metal media into the desired shape, e.g., a cylindrical or tube-like filter. In at least some instances, the molding is performed by axial pressing. The molding can also be performed by other pressing methods, e.g., isostatic pressing. In certain embodiments, a fiber material is measured and mixed with a liquid to form a mixture that is molded using a forming fixture. Non-limiting examples of liquids with which a fiber material may be mixed include water, water-based solutions, alcohol, alcohol-based solutions, glycerin, and mixtures thereof. In some embodiments, the mixture is free of binders. Alternatively, the fiber can be molded dry by, for example, air classification. Various methods of compaction to achieve a desired density are well known.

Figure 5A:
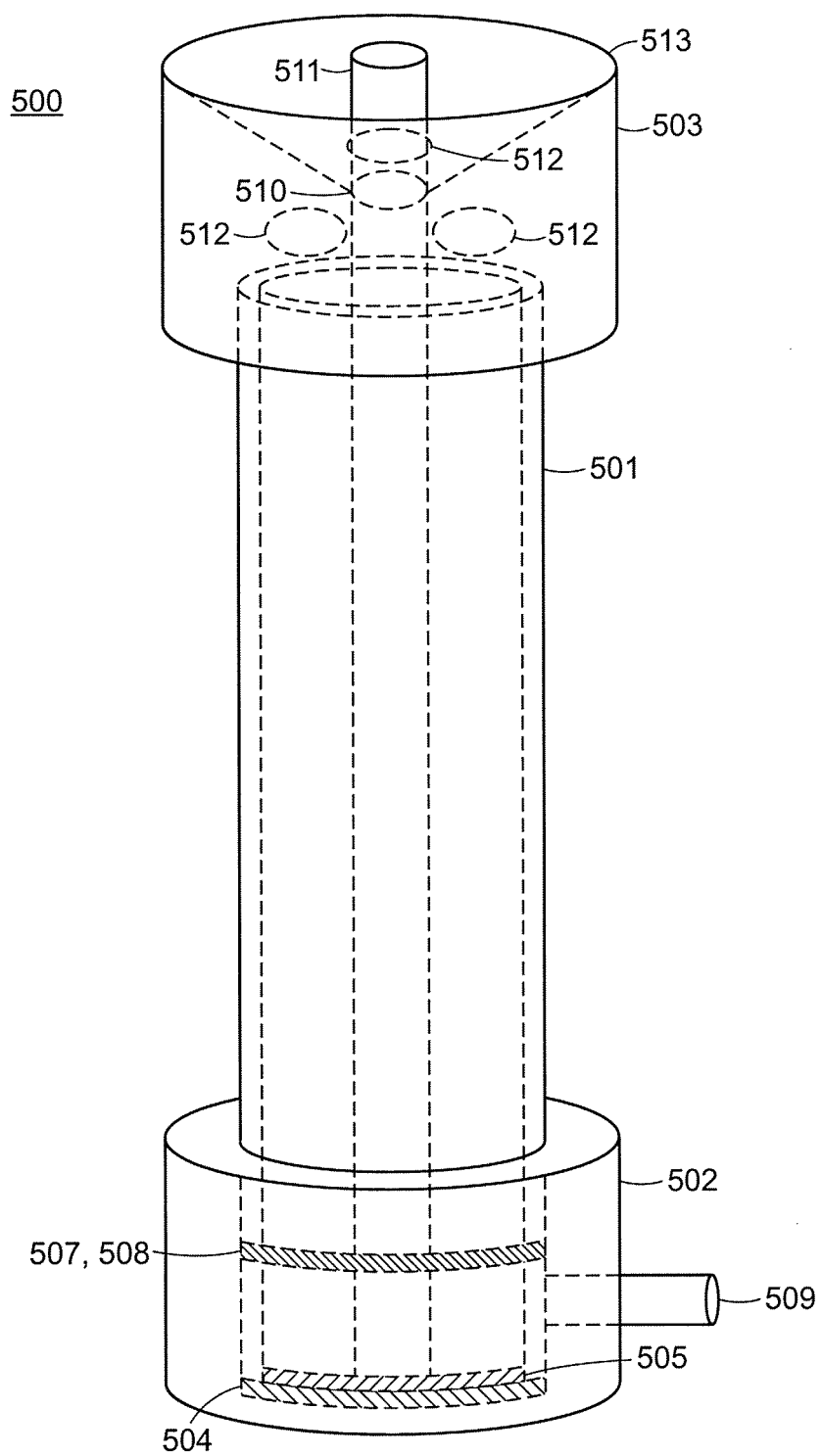
FIGS. 5A and 5B illustrate a forming fixture for use in fabricating a filter according to certain embodiments.
Figure 5B:
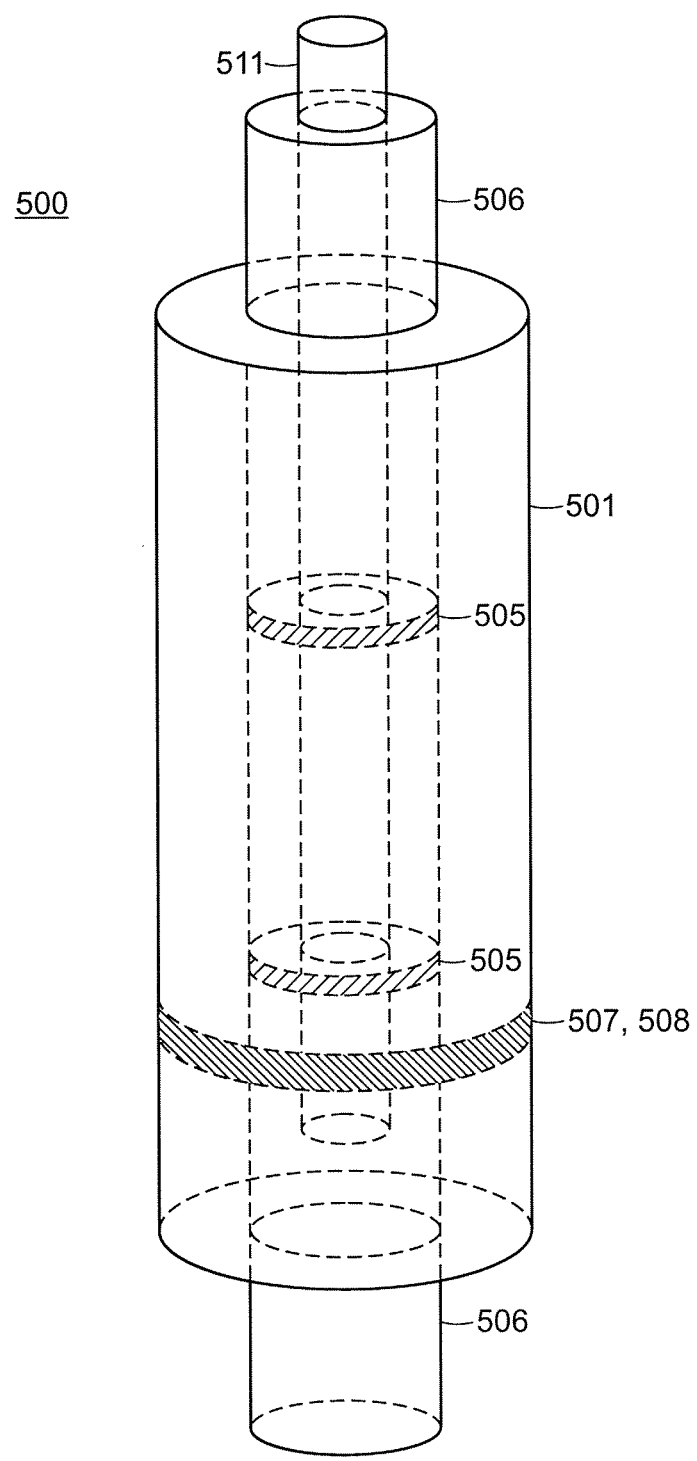

A non-limiting example of a suitable forming fixture for making a filter element as described herein includes a cylindrical assembly for axial pressing. In one such assembly, illustrated in FIGS. 5A and 5B, a forming fixture 500 includes a forming tube 501, two end caps 502, 503, one larger porous washer 504, two smaller porous washers 505, and two push tubes 506. For example, the forming tube 501 is a metal cylinder, e.g., stainless steel with a hollow core. In the illustrated embodiment, near the bottom end of the forming tube 501 is a notch 507 in the outer surface of the tube fitted with a gasket 508, e.g., an o-ring. As a non-limiting example, in the illustrated embodiment, the forming tube 501 is 11 inches long, with an outer diameter of approximately 1.6 inches, and an inner diameter of approximately 1.2 inches. The dimensions of the forming tools are adjusted such that fiber tubes of different dimensions and densities can be produced.

The forming tube 501 is mated with the two end caps 502, 503, e.g., made of plastic, one for each end. In certain embodiments, the bottom end cap 502, which can mate with the bottom end of the forming tube 501, has a valve 509 to which a vacuum line can be attached. In at least some such embodiments, the top end cap 503 is a fill cap that has a rod hole 510 through the middle of the cap through which the core rod 511 can extend, additional flow holes 512 around the rod hole 510 through which the fiber and liquid mixture can flow, and a reservoir top 513 into which the fiber and liquid mixture can be poured before flowing through the flow holes 512. Both end caps 502, 503 are designed to fit over the forming tube 501. As such, both end caps 502, 503 have an inner hollowed out section with a diameter substantially the same as an outer diameter of the forming tube 501.

The core rod 511, e.g., made of stainless steel, is used within the forming tube 501. In certain embodiments, the core rod 511 is smaller in diameter (e.g., in the illustrated embodiment, approximately 0.5 inches in diameter) and slightly longer than the inside of the forming tube 501, such that when the bottom end of the forming tube 501 is mated with the bottom end cap 502, the forming tube 501 is placed around the core rod 511 and inserted into the bottom end cap 502, and the fill cap 503 is attached to the top end of the forming tube 501, the top end of the core rod 511 is substantially flush with a top of the rod hole 510 in the fill cap 503.

The smaller porous washers 505 have an inner diameter substantially equal to the diameter of the core rod 511 and an outer diameter substantially equal to an inner diameter of the forming tube 501. The larger porous washer 504 also has an inner diameter substantially equal to the diameter of the core rod 511, but has an outer diameter substantially equal to the outer diameter of the forming tube 501. The two push tubes 506 have an outer diameter smaller than the inner diameter of the forming tube 501 and an inner diameter larger than the diameter of the core rod 511. In some embodiments, the push tubes 506 are stainless steel. As a non-limiting example, in the illustrated embodiment, the push tubes 506 are each approximately 7 inches long. The dimensions of the forming tools are adjusted such that fiber tubes of different dimensions and densities can be produced.

To assemble the forming fixture 500, the bottom end cap 502 is placed on a surface, and the larger porous washer 504 is placed inside the end cap 502. The bottom end of the forming tube 501 is then placed into the bottom end cap 502 such that the gasket 508 creates a seal with the end cap 502. The forming tube 501 is pressed down into the bottom end cap 502 until the forming tube bottoms out on the larger washer 504 in the bottom end cap 502. The core rod 511 is then placed through the forming tube 501 and through the larger washer 504 such that the core rod 511 bottoms out in the bottom end cap 502. A smaller washer 505 is then placed on the core rod 511 and inserted into the forming tube 501. The smaller washer 505 slides all the way down the core rod 511 so that it rests on top of the larger washer 504. The fill cap 503 is then placed onto the core rod 511 and onto the top end of the forming tube 501. The fill cap 503 fits snugly onto the top end of the forming tube 501 to avoid leakage when the fiber and liquid mixture is poured into the fill cap 503.

In one non-limiting example of a method for making a filter as described herein, the assembled forming fixture 500 is placed on a vibrating table, for example, a No. 200 Extra-Heavy Duty Vibrator (Buffalo Dental Manufacturing Co., Syosset, N.Y.). A vacuum line is then attached to the valve 509 on the bottom end cap 502, and the vacuum is turned on, in at least some instances initially to a low vacuum setting. The vibrating table is then turned on. The fiber and liquid mixture is well-mixed, and a small amount is poured into the fill cap 503, after which the vacuum line is fully opened. The fiber and liquid mixture typically is continually mixed as it is poured into the fill cap 503 and flows into the space around the core rod 511 and within the inner wall of the forming tube 501. After all the fiber and liquid mixture has been poured into the forming tube 501 through the fill cap 503, additional liquid is poured into the fill cap 503 to clean any leftover fiber material that did not flow through the fill cap 503 and into the forming tube 501. In some alternative embodiments, a vibrating table is not employed. In some alternative embodiments, instead of employing a vacuum, a pressure differential is created to remove liquid from the mold by applying pressurized gas to the fill cap end of the mold.

Once the liquid level has dropped into the forming tube 501, the fill cap 503 is removed from the forming tube 501. A second smaller porous washer 505 is then placed onto the core rod 511 and into the forming tube 501. A first push tube 506 is then placed around the core rod 511, inside of the forming tube 501, and on top of the second smaller washer 505. The gravitational force of the first push tube 506 slowly pushes the second smaller washer 505 down into the tube. Once the first push tube 506 stops moving down the forming tube 501, the vibrating table is turned off and the vacuum is turned off. The vacuum is bled off and the vacuum line is then removed from the valve 509 on the bottom end cap 502.

The forming tube 501 is then placed on its side, and the bottom end cap 502 and the larger washer 504 are removed from the forming tube 501. The second push tube 506 is inserted into the forming tube 501 through the bottom end of the forming tube 501 so it is adjacent a smaller washer 505. The second tube is then pushed into the forming tube 501, e.g., approximately three inches. The forming fixture 500, including the forming tube 501, the core rod 511, and the two push tubes 506, is then picked up and stood on any hard surface with the bottom end down. Downward pressure is applied to the top push tube 506, further compressing the forming fixture 500. By way of non-limiting example, in the illustrated embodiment, the forming fixture is compressed until the total length of the fixture 500, including both push tubes 506 extending from the forming tube 501, is approximately 17 inches, yielding a green fiber tube approximately 3.2 inches long. The dimensions of the forming tools are adjusted such that fiber tubes of different dimensions and densities can be produced.

The forming fixture 500 is then stood up on a table with the bottom end up and the top end down on the table. The push tube 506 that is now on the top of the forming tube 501 is removed, and the forming tube 501 is pushed down until it bottoms out on the table top. The push tube 506 that was removed is then put under the push tube 506 that is now on the bottom of the forming tube 501, so that the push tubes 506 are adjacent. When they are adjacent, the forming tube 501 is pushed down to the table while the core rod 511 is held steady. This pushes the formed fiber tube out of the forming tube 501. The two smaller washers 505 are then removed from the core rod 511, and the formed fiber tube is also removed from the core rod 511.

The formed fiber tube is then dried and sintered to form a filter element. In certain embodiments, the formed fiber tube is placed on a sintering tray, between two fixed rings. The fixed rings prevent the formed fiber tube from expanding as it dries. The formed fiber tube is dried at a temperature of about 70 to about 200 degrees C., for example, about 75 degrees C., in an oven, for between about 2 hours and about 12 hours, for example, about 3.5 hours. The dried formed fiber tube is then sintered in a furnace, for example in a vacuum furnace or in atmospheric conditions with nitrogen or hydrogen on a conveyor belt, for about 30 to about 120 minutes, for example, about 60 minutes, at about 1800 to about 2100 degrees F., for example, about 1900 degrees F.

After cooling, the sintered fiber tube is capable of filtration. In certain embodiments, however, the sintered fiber tube is welded into a filter housing or other hardware. In some such embodiments, the ends of the fiber tube are densified to facilitate welding, which can be difficult for a fiber tube having a low packing density. In certain embodiments, a sintered fiber tube is densified at the ends while retaining its filtering characteristics by contouring both ends of the tube so that the outer diameter gradually decreases near the ends. As a non-limiting example, in some embodiments this is achieved by spinning the sintered filter tube on a lathe and gradually compressing the sintered filter tube at the ends by contacting the spinning sintered filter tube with an external wheel. In at least some instances, this is accomplished by burnishing with a roller burnisher tool. Densifying compresses the ends of the tube, for example, by a factor of about 1.5 to about 3.5, and in some instances about 2.5. For example, in some embodiments, the sintered filter tubes have a wall thickness along their entire lengths, before being densified, of approximately 0.25 inches to approximately 0.30 inches. In some such embodiments, after being densified, the sintered filter tubes have a wall thickness at their ends in the range of approximately 0.06 inches to approximately 0.10 inches. In some alternative embodiments, the tube is not densified, e.g., having approximately uniform density and wall thickness throughout.

An axial pressing operation such as that described with respect to FIG. 5 has been surprisingly found to provide advantages. However, other typical methods of pressing fiber metal, such as isostatic pressing, or isopressing, are also contemplated. Isopressing can be done, for example, by placing the fiber mixture in a pressure vessel, in which its is compacted radially inward.

It was not expected that axial pressing, e.g., pressing along the axis of a cylinder, as in some embodiments described herein, would produce suitable fiber tubes. That is because axial pressing traditionally involves an uneven force distribution that produces a density gradient over the length of a pressed cylinder, so that the density decreases toward the axial center along its length. However, it was found that axial pressing methods as described herein, for example, as illustrated and described with respect to FIG. 5, reduce this gradient to levels that do not substantially interfere with filter performance. While not to be bound by theory, it is believed that a density gradient is formed over the length of a cylindrical fiber part when a fiber and liquid mixture is poured into a mold; axial pressing tends to reduce this gradient. This reduction, in part, occurs since the presence of the liquid assists in providing a more uniform distribution of the compacting force (and thus pressure) throughout the fiber tubular element and aids lubricity to reduce fiber drag on the tooling walls. However, dry pressing of the fibers is also contemplated. Axial pressing also advantageously provides substantially uniform inner and outer diameters for the filter tube. As one skilled in the art will appreciate, density gradients can be controlled to a certain extent by controlling parameters such as the wall thickness and length of the filter tube, levels of vibration, fill rate and homogeneity of the fiber and liquid mixture, and rate of compaction.

Figure 6:
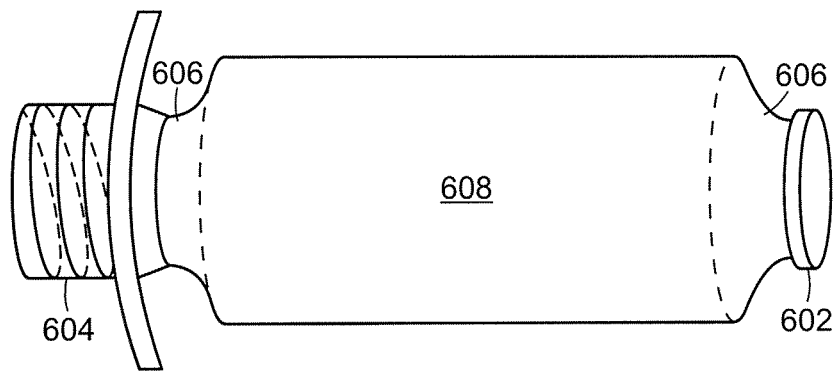
FIG. 6 is a side view of a filter assembly according to certain embodiments. The ends are densified, with a smaller outer diameter at the ends of the filter element than at the center section. The right end of the filter element has been welded to an end cap and the left end of the filter element has been welded to a housing outlet.

In certain embodiments, once densified, the sintered fiber tubes are welded at the densified ends. For example, to one end of the tube is welded a metal end cap, which precludes the flow of fluid through that end of the tube, and to the other end of the tube is welded a housing outlet through which fluid can flow. FIG. 6 shows a densified sintered filter tube 600 according to certain embodiments, to which has been welded an end cap 602 on the right side and a housing attachment 604 on the left side. Typically, densification at the ends of a filter element to facilitate welding can lead to the creation of crevices in the sintered fiber tube, or other damage to the structure. However, in at least some embodiments, for example, as illustrated in FIG. 6, these problems are reduced by contouring the densification, such that the density increases gradually from a center portion of the sintered filter tube 608 to an end portion of the tube 606. The tube 600 is tapered or contoured from the center portion 608 to the end 606, reflecting this density gradient. Creating a density gradient that gradually increases toward the end of the filter tube helps to prevent imperfections in the fiber structure that might otherwise result from abrupt changes in density or the densification process. The density gradient is created during the densification process of the sintered filter element, for example, by burnishing with a roller-burnisher tool as described herein.

Figure 7:
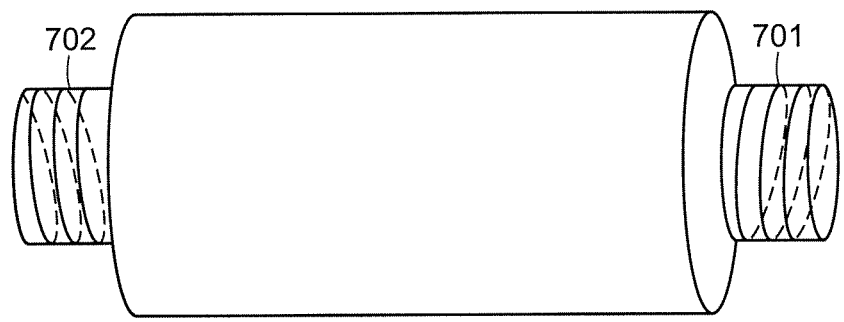
FIG. 7 is a side view of a filter according to certain embodiments.

FIG. 7 shows a non-limiting example of a filter housing 700 that has been constructed around a filter such as the one shown in FIG. 6, creating a finished inline porous metal filter. The housing 700 is typically metal, such as stainless steel, e.g., 316L stainless steel. In certain embodiments, such a housing in combination with a filter tube as described herein provides high temperature tolerance, for example, in some embodiments up to about 450 degrees C. In various embodiments, alternative housings are employed, including standard filter housings used in the field.

FIGS. 8A-B illustrate a filter tube 600 according to certain embodiments, with end cap 602 and filter housing attachment 604, contained within filter housing 700. The housing attachment 604 provides a non-limiting example of a part suitable for attaching the filter tube 600 to the housing 700. The adapter 604 includes an interior ring portion 802 for securing the end of the filter element 600, and a screw portion 804 for inline attachment to a fluid feed during operation.

Referring to FIG. 8B, the filter is placed inline in a fluid flow. Fluid can flow into and through the filter housing from either end during operation. For example, in some instances fluid flows in from the right side of the figure, through the right opening 701 of the housing 700. Fluid cannot penetrate the end cap 602 on the right side of the filter member 600, so it flows around the end cap 602 and around the filter element 600. The pressure of the flow forces the fluid through the filter element 600, thus filtering a very large proportion of the particulate matter in the fluid. The fluid penetrates the filter element 600, is filtered by the filter element 600, and flows out the filter element 600 and out of the housing 700 through the opening 702 on the left side of the figure.

FIGS. 9A-B illustrate a cylindrical filter element 600 according to certain embodiments. In some instances, the inner diameter of the filter 600 is between about 0.1 inches and about 2 inches, for example, about 0.3 inches to about 1 inch, about 0.4 inches to about 0.8 inches, or about 0.6 inches. In some instances, the wall thickness in the center of the filter element 600 is between about 0.1 inches and about 1.5 inches, for example, about 0.25 inches to about 1 inch, or about 0.5 inches. As illustrated in FIG. 9, in certain embodiments, the outer diameter tapers from a center portion 608 of the filter element 600 toward an end portion 606 of the filter element 600, reflecting densification of the ends 606 of the filter element 600. For example, in certain embodiments, the cylinder has a thickness of about 0.2 inches to about 0.3 inches in the center of the filtration element, and a thickness of about 0.1 inch at the ends of the filtration element. In some instances, the length of the cylindrical filter 600 is about 0.5 inches to about 15 inches, about 1 inch to about 4 inches, or about 2 inches to about 3 inches, for example, about 2.8 inches.

Because of the three-dimensional shape or curvature of the fibers employed, filter elements as described herein exhibit low density/high porosity in at least some embodiments. In at least some instances the density of a sintered fiber filter element ranges from about 2% to about 30%, for example, from about 5% to about 18%, about 5% to about 13%, about 4% to about 8%, or about 10% to about 14%. In some instances, the density of a filter is about 6%, about 12%, or about 17% to about 18%. The density is adjustable, for example, based on the degree of compression and/or the quantity of fibers employed in manufacturing the filter element. Higher densities are achieved using greater compression and/or larger quantities of fiber. In some instances, a higher density is employed to promote higher capture efficiency. In some instances, a lower density is employed to promote lower pressure drop across the filter.

In part due to the low densities, in at least some embodiments, filters as described herein provide low pressure drops during operation. As a non-limiting example, in high-pressure compressed gas lines, where the pressure of the gas being filtered can exceed 1000 psi, some filters as described herein afford pressure drops ranging from about 2 psi to about 10 psi. For applications in lower pressure environments, filters according to some embodiments afford pressure drops ranging from about 0.1 psi to about 5 psi, for example, from about 0.2 psi to about 1 psi.

Figure 10:
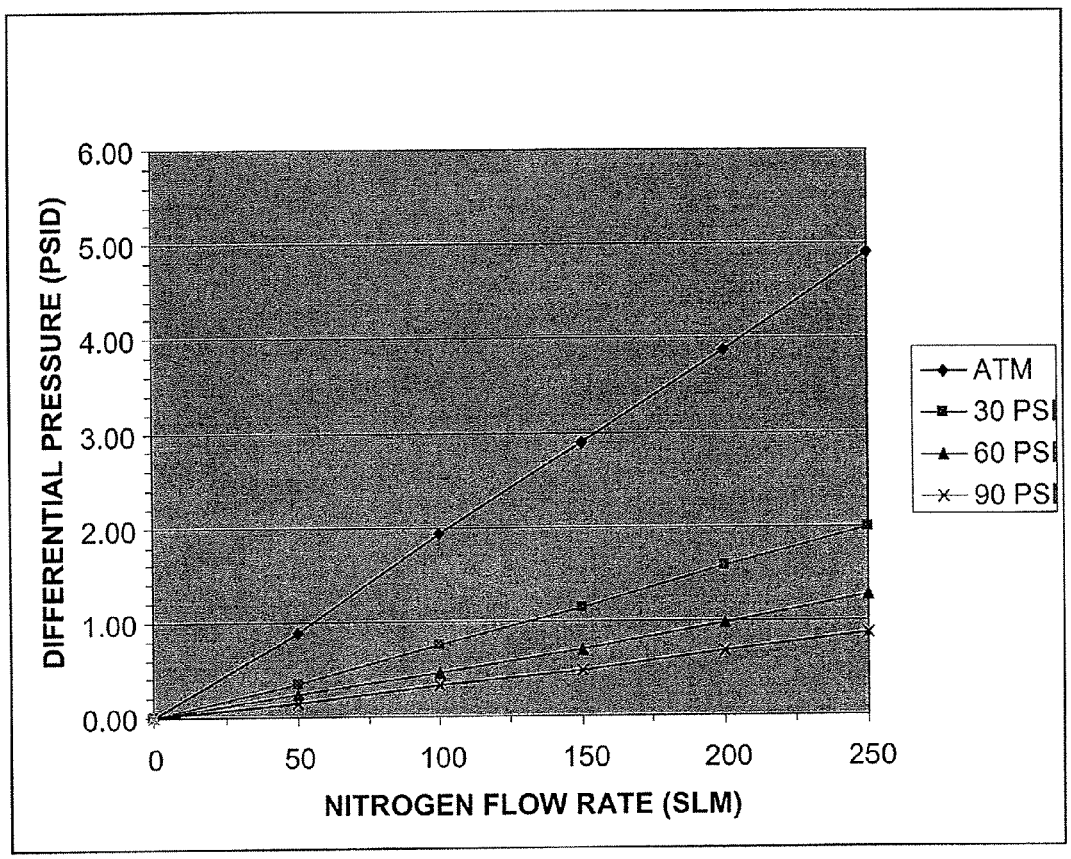
FIG. 10 is a plot of the differential pressure across a filter according to certain embodiments versus the flow rate through the filter at varying pressures.

FIG. 10 is a plot of the differential pressure across a filter versus the flow rate through the filter at varying pressures. The pressure drop data in FIG. 10 represent 4 sets of data for a filter made according to Examples 1 and 2 below. The fluid in all cases was high pressure ultra-high purity nitrogen. The gas flow rate was measured with a mass flow meter which was located downstream of the filter and the backpressure control valve (when used). For one set, the pressure at the exit of the filter is at atmospheric conditions (nominally 1 atm and 70° F.) and the upstream pressure increased to obtain the associated flow rate and differential pressure across the filter. For the other 3 cases, the inlet pressure was held constant at either 30, 60 or 90 psig and the pressure drop across the filter monitored while a valve located downstream of the filter was used to control both gas flow rate and back pressure at the exit of the filter.

Figure 11:
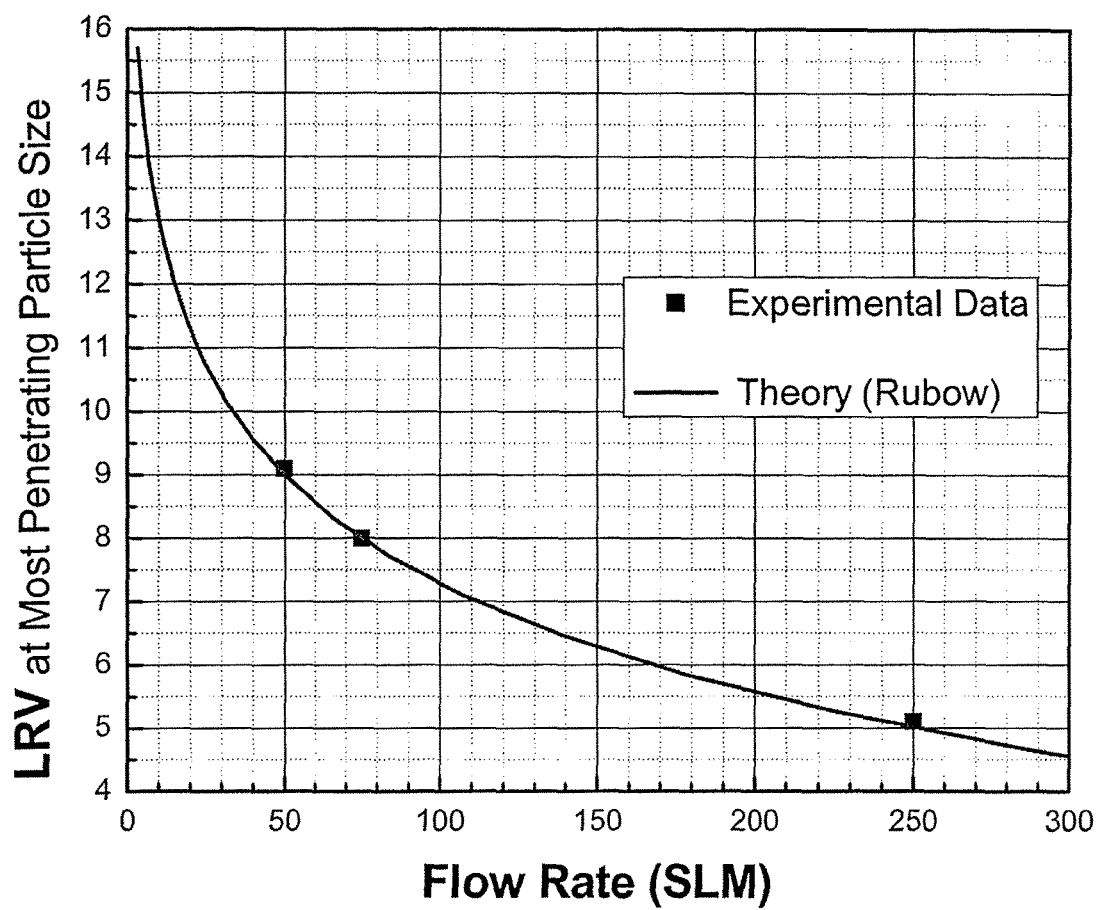
FIG. 11 is a plot of the efficiency rate of removal of a most penetrating particle size versus the flow rate through a filter according to certain embodiments.

The filters in at least some embodiments provide high capture efficiency. In some embodiments, efficiencies of 99.9999999% or greater, determined at a most penetrating particle size, i.e., 9 log reduction value (9LRV), are provided. In other embodiments, lower efficiencies, such as 5LRV or greater, are employed, for example, if very high efficiency is not required, or particularly low pressure drop is desired. FIG. 11 is a plot showing the relationship between filter efficiency and flow rate through a filter made as described in Examples 1 and 2, measured at a most penetrating particle size. The theoretical curve was obtained using particle collection theory for fibrous media as developed by Rubow, explained in Rubow, K. L., "Submicron Aerosol Filtration Characteristics of Membrane Filters", *Ph.D. Thesis*, University of Minnesota, Mechanical Engineering Department, Minneapolis, Minn. (1981).

The low packing densities of the filters of some embodiments allow for a lower pressure drop per unit level of particle capture. Put another way, the filters of some embodiments allow for a high level of particulate capture per unit of pressure drop. While this comparison can be made at any particle size, using the particle capture efficiency as measured at a most penetrating size represents the most difficult particle size to capture, i.e., the particle size with the lowest capture efficiency or lowest LRV. Unless expressly indicated otherwise, all LRV values identified herein are measured at a most penetrating particle size. Furthermore, the ratio of LRV to pressure drop at a given flow rate can also be computed at any system pressure, e.g., as illustrated for the 4 different pressure drop curves presented in FIG. 10. For consistency, this ratio is computed for the case where pressure at the exit of the filter is at atmospheric conditions (nominally 1 atm and 70° F.), the gas is ultra-high purity nitrogen, and the upstream pressure increased to obtain the associated flow rate and differential pressure across the filter, as presented in FIG. 10. This ratio is also dependent on gas flux rate (velocity), which is flow rate per unit effective filter surface area. For a cylinder, the effective area is computed based on the diameter at the midpoint of the wall thickness (calculated for the tube prior to densifying the ends). In the case of a filter prepared according to Examples 1 and 2, the effective diameter is 0.75 in and resultant effective area is 6.6 inch. At flow rates of 50, 75 and 250 SLM, the resultant flux is 7.6, 11.4 and 37.9 SLM/inch$^2$. The ratio of LRV to pressure drop at these 3 flow rates is 10.1, 5.7 and 1.0 psid$^{-1}$, respectively.

Particle retention testing was performed using the following procedure. Each filter was challenged at its maximum rated flow with polydispersed NaCl particles. The mean size of the particles was 0.07 μm, which is in the vicinity of the most penetrating particle size. The test filter was purged with compressed filtered ultra-high purity nitrogen gas at ambient temperatures. The particle background counts were maintained at zero prior to initialization of the particle challenge portion of the test. The particle concentration upstream and downstream of the test filter was simultaneously measured with two condensation particle counters (CPC). The particle retention results are listed as log reduction value (LRV). LRV is the log of the ratio of particle concentration upstream of the filter to particle concentration downstream of the filter. The test methodology for evaluating high LRV rating is described in Rubow et al., *"A Low Pressure Drop Sintered Metal Filter for Ultra-High Purity Gas Systems,"* Proceedings of the 43rd Annual Technical Meeting of the Institute of Environmental Sciences, pp. 834-840 (1991), and Rubow, K. L., D. S. Prause and M. R. Eisenmann, "A Low Pressure Drop Sintered Metal Filter for Ultra-High Purity Gas Systems", *Proc. of the 43$^{rd}$ Annual Technical Meeting of the Institute of Environmental Sciences*, (1997), which are incorporated herein by reference.

For example, a cylindrical filter prepared according to Examples 1 and 2 was measured to provide a removal rating at a most penetrating particle size, with efficiency exceeding 9 LRV at a flow of less than 50 SLM, and exceeding 5 LRV at a flow of less than 250 SLM.

In some alternative embodiments, processes similar to those described above are used to produce filters having different shapes, such as a star or pleated shape. These shapes can have internal features that correspond to the contour of the external feature, are cylindrical and/or some combination of these. These varying shapes are created through the use of a die or mold that corresponds to the resultant shape. In some embodiments, processes similar to those described above are used to produce filters with non-circular cross-sections, in an inner diameter, an outer diameter, or both. In some embodiments, resulting filters have a non-uniform shape along a length of the filter, in an inner diameter, and outer diameter, or both. By way of nonlimiting example, processes similar to those described above are used to produce filters with a star-shaped outer surface at a center portion of the filter, and a cylindrical shaped outer surface at the end portions of the filter. This can be accomplished, for example, by using a forming tube that has a star-shaped interior at a center portion and a cylindrical shaped interior at the end portions. The inner surface of the filter can similarly have a non-uniform shape based on the corresponding shape of the core rod.

Filters as described herein are useful in a variety of applications where fiber filters are desired. For example, as will be understood by those skilled in the art, filters according to certain embodiments are provided in a housing or affixed to other hardware such as a flange or mount for incorporation into a system that provides gases for semiconductor processing, e.g., in compressed gas lines, and processes used in the biopharmaceutical industry.

The following non-limiting examples further illustrate certain embodiments.

EXAMPLE 1

A cylindrical filter element was made using metal fibers as described in U.S. Pat. No. 7,045,219 (N.V. Bekaert S.A., Belgium—Bekinox SF 1.5 μm/316 LV Z60). The fibers were 316L stainless steel, about 1.5 microns in diameter and nominally about 75 to about 100 microns long. 22 g of metal fiber was measured into a glass beaker. 1000 mL deionized water was measured into a plastic Tri-Pore beaker, and 200 mL deionized water was measured into a separate plastic Tri-Pore beaker. The 22 g of fiber was mixed into the 1000 mL deionized water and stirred with a glass stirring rod until thoroughly mixed. The fiber/water mixture was poured into and compressed using a forming fixture as illustrated in FIG. 5, using a vibrator table and vacuum, as described in detail above with reference to operation of the fixture of FIG. 5. The 200 mL additional deionized water was used to clean remaining fiber into the tooling before compression. Compression yielded a green fiber tube approximately 3.2 inches long. The fiber tube was removed from the forming fixture and placed onto a sintering tray between two rings. The tube was dried at 75 degrees C. in an oven for at least 3.5 hours, and then sintered in a vacuum furnace at 1900 degrees F. for 60 minutes. The resultant tube had a 1.10 inch outside diameter and a 0.41 inch inside diameter. The filter element was then cut to a length of 2.8 inches and the ends roller burnished to achieve the contoured shaped shown in FIG. 9 with the outside diameter of each end at 0.80 inch.

EXAMPLE 2

The filter element made according to Example 1 was then subsequently welded and assembled to achieve a filter as shown in FIGS. 6 and 8. This filter was subsequently tested to obtain the pressure drop data and particle collection efficiency data shown in FIGS. 10 and 11, respectively.

A filter particle loading test was performed on a filter made according to Example 1. The air flow rate was 100 SLM, the particle size was 0.07 microns, which was determined to represent the most penetrating particle size, the challenge concentration was 20,000 particles per cubic centimeter, and the initial LRV was 7.3. The total particle challenge for this test was five trillion particles, and the final LRV was greater than 9. The initial pressure drop was 1.8 psid and the final pressure drop was 2.1 psid, which represented an increase of 0.3 psid or 16%. These results demonstrate that the filter pressure drop increased only a modest amount while the filter was subjected to a high degree of particle loading (i.e., high relative to values found in the semiconductor industry).

EXAMPLE 3

A cylindrical filter element was made using metal fibers as described in U.S. Pat. No. 7,045,219 (N.V. Bekaert S.A., Belgium—Bekinox SF 1.5 μm/316 LV Z60). The fibers were 316L stainless steel, about 1.5 microns in diameter and nominally about 75 to about 100 microns long. 44 g of metal fiber was measured into a glass beaker. 1500 mL deionized water was measured into a plastic Tri-Pore beaker, and 200 mL deionized water was measured into a separate plastic Tri-Pore beaker. The 44 g of fiber was mixed into the 1500 mL deionized water and stirred with a glass stirring rod until thoroughly mixed. The fiber/water mixture was poured into and compressed using a forming fixture as illustrated in FIG. 5, using vacuum, as described in detail above with reference to operation of the fixture of FIG. 5. The 200 mL additional deionized water was used to clean remaining fiber into the tooling before compression. Compression yielded a green fiber tube approximately 3.2 inches long.

The fiber tube was removed from the forming fixture and placed onto a sintering tray between two rings. The tube was dried at 75 degrees C. in an oven for at least 3.5 hours, and then sintered in a vacuum furnace at 1900 degrees F. for 60 minutes. The resultant tube had a 1.10 inch outside diameter and a 0.41 inch inside diameter. The filter element was then cut to a length of 2.8 inches and the ends roller burnished to achieve the contoured shaped shown in FIG. 9 with the outside diameter of each end at 0.80 inch to 1.00 inch was then subsequently welded and assembled to achieve a filter as shown in FIGS. 6 and 8.

Pressure drop and efficiency tests were performed on a 1.40 inch long, non-contoured, section of the filter element. The pressurized gas was nitrogen and both the pressure drop and efficiency measured with atmospheric gas conditions at the filter exit. The particle size was 0.07 microns, which was determined to represent the most penetrating particle size. This filter element produces a particle retention level of >9 LRV at a gas flow rate of 150 SLM and pressure drop of 13.1 psid. The particle retention level was also >9 LRV at a gas flow rate of 175 SLM and pressure drop of 14.9 psid. The particle retention level was also >9 LRV at a gas flow rate of 250 SLM and pressure drop of 19.2 psid. The pressure drop was 5.1, 9.2, 12.9, and 16.3 psid at flow rates of 50, 100, 150, and 200 SLM, respectively.

Pressure drop and efficiency tests were also performed on a 1.00 inch long, non-contoured, section of the filter element. The pressurized gas was nitrogen and both the pressure drop and efficiency measured with atmospheric gas conditions at the filter exit. The particle size was 0.07 microns, which was determined to represent the most penetrating particle size. This filter element produces a particle retention level of >9 LRV at a gas flow rate of 250 SLM and pressure drop of 25.0 psid. The pressure drop was 7.1, 12.4, 17.0 and 21.4 psid at flow rates of 50, 100, 150, and 200 SLM, respectively.

EXAMPLE 4

A cylindrical filter element was made using metal fibers as described in U.S. Pat. No. 7,045,219 (N.V. Bekaert S.A., Belgium—Bekinox SF 1.5 μm/316 LV Z60). The fibers were 316L stainless steel, about 1.5 microns in diameter and nominally about 75 to about 100 microns long. 11 g of metal fiber was measured into a glass beaker. 500 mL deionized water was measured into a plastic Tri-Pore beaker, and 100 mL deionized water was measured into a separate plastic Tri-Pore beaker. The 11 g of fiber was mixed into the 500 mL deionized water and stirred with a glass stirring rod until thoroughly mixed. The fiber/water mixture was poured into and compressed using a forming fixture as illustrated in FIG. 5, using vacuum, as described in detail above with reference to operation of the fixture of FIG. 5. The 100 mL additional deionized water was used to clean remaining fiber into the tooling before compression. Compression yielded a green fiber tube approximately 3.2 inches long.

The fiber tube was removed from the forming fixture and placed onto a sintering tray between two rings. The tube was dried at 75 degrees C. in an oven for at least 3.5 hours, and then sintered in a vacuum furnace at 1900 degrees F. for 60 minutes. The resultant tube had a 0.865 inch outside diameter and a 0.550 inch inside diameter and a density range of between 6 and 7.2 percent dense. The filter element was then cut to a length of 2.8 inches and the ends roller burnished to achieve the contoured shape shown in FIG. 9 with the outside diameter of each end at a range of 0.80 to 0.60 inch. This filter element produces a particle retention level of 6.6 LRV at a gas flow rate of 50 SLM and pressure drop of 0.53 psid. The pressure drop was 0.09, 0.16, 0.23, and 0.33 psid at flow rates of 5, 10, 20, and 30 SLM, respectively. The test gas was pressurized nitrogen and both the pressure drop and efficiency measured with atmospheric gas conditions at the filter exit. The particle size was 0.07 microns, which was determined to represent the most penetrating particle size.

As will be apparent to one of ordinary skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:
1. A method of making a sintered fiber filter element, the method comprising:

(a) providing a mold having a cylindrical cavity with an end closure at one end of the cylindrical cavity, and a fill cap at another end of the cylindrical cavity, wherein the fill cap is removable to provide an open end, and a core rod movably sealed in said end closure and extending coaxially within said cavity;

(b) orienting said mold vertically with said open end disposed upwardly;

(c) introducing fiber and liquid into said cavity through said open end substantially radially evenly about said core rod;

(d) creating a pressure differential in the mold to expel liquid from the mold;

(e) applying pressure to said mold and thereby to said fiber in said cavity, whereby said fiber coheres to form a substantially tube-shaped structure;

(f) removing said substantially tube-shaped structure from said mold;

(g) sintering said substantially tube-shaped structure to obtain a porous tube-shaped sintered filter element having a first end and a second end; and (h) densifying the ends of said porous tube-shaped sintered filter element.

2. The method of claim 1, wherein densifying the ends of said porous tube-shaped sintered filter element includes rotating said porous tube-shaped sintered filter element while applying a roller burnisher tool to the ends of said porous tube-shaped sintered filter element.

3. The method of claim 1, wherein densifying the ends of said porous tube-shaped sintered filter element includes rotating said porous tube-shaped sintered filter element while applying a tool to at least one end of said porous tube-shaped sintered filter element, and wherein the tool is designed to provide a gradual transition from a center portion of the filter element to an end of the porous tube-shaped sintered filter element.

4. The method of claim 1, wherein the fiber includes metal fiber.

5. The method of claim 4, wherein the metal includes stainless steel.

6. The method of claim 1, wherein the liquid includes water.

7. The method of claim 1, wherein the end closure is removable.

8. The method of claim 1, further comprising attaching a vacuum line to the mold, and opening the vacuum line while introducing fiber and liquid to the cavity.

9. The method of claim 1, further comprising drying said tube-shaped structure before sintering said tube-shaped structure.

10. The method of claim 1, further comprising welding an end of said porous tube-shaped sintered filter element to an end cap.

11. The method of claim 1, further comprising welding an end of said porous tube-shaped sintered filter element to a filter end fitting or housing.

12. The method of claim 1, further comprising applying pressure to the porous tube-shaped sintered filter element to control the density, shape, or length of the structure.

13. The method of claim 1, further comprising vibrating the mold.

14. The method of claim 1, wherein creating a pressure differential in the mold to expel liquid from the mold comprises applying a vacuum to the mold.

15. The method of claim 1, wherein creating a pressure differential in the mold to expel liquid from the mold comprises supplying pressurized gas to the open end of the cavity.

* * * * *